(12) United States Patent
Beimdieck et al.

(10) Patent No.: US 10,630,029 B2
(45) Date of Patent: Apr. 21, 2020

(54) CHARGING PLUG-IN CONNECTOR HAVING AN ACUTUATOR

(71) Applicant: HARTING Automotive GmbH, Espelkamp (DE)

(72) Inventors: Carsten Beimdieck, Bramsche (DE); Daniel Boesch, Kirchlengern (DE)

(73) Assignee: HARTING Automotive GmbH, Espelkamp (DE)

( * ) Notice: Subject to any disclaimer, the term of this patent is extended or adjusted under 35 U.S.C. 154(b) by 0 days.

(21) Appl. No.: 16/105,843

(22) Filed: Aug. 20, 2018

(65) Prior Publication Data
US 2019/0058295 A1 Feb. 21, 2019

(30) Foreign Application Priority Data

Aug. 21, 2017 (DE) .......................... 10 2017 119 056

(51) Int. Cl.
| | | |
|---|---|---|
| *H01R 13/70* | (2006.01) | |
| *B60L 53/16* | (2019.01) | |
| *H01R 13/46* | (2006.01) | |
| *H01R 13/627* | (2006.01) | |

(52) U.S. Cl.
CPC ............ *H01R 13/701* (2013.01); *B60L 53/16* (2019.02); *H01R 13/46* (2013.01); *H01R 13/6272* (2013.01); *H01R 2201/26* (2013.01)

(58) Field of Classification Search
CPC .. H01R 13/701; H01R 13/6272; H01R 13/46; H01R 2201/26; H01R 13/62; H01R 13/6291; H01R 13/62933; H01R 13/6335; H01R 13/629; H01R 13/6275; B60L 11/1818; B06L 53/16; Y10S 439/911

USPC ...... 439/188, 160, 476.1, 483, 34, 310, 352, 439/372, 911
See application file for complete search history.

(56) References Cited

U.S. PATENT DOCUMENTS

| | | | | |
|---|---|---|---|---|
| 5,433,623 | A * | 7/1995 | Wakata ................. | B60L 3/0069 439/310 |
| 5,458,496 | A * | 10/1995 | Itou ..................... | B60L 11/1818 439/34 |
| 6,225,153 | B1 * | 5/2001 | Neblett ................. | B60L 50/66 438/188 |

(Continued)

FOREIGN PATENT DOCUMENTS

| | | |
|---|---|---|
| CN | 101944683 A | 1/2011 |
| CN | 205531794 U | 8/2016 |

(Continued)

OTHER PUBLICATIONS

German Office Action, dated Jul. 2, 2018, for German Application No. 10 2017 119 056.2, 6 pages.

(Continued)

*Primary Examiner* — Travis S Chambers
(74) *Attorney, Agent, or Firm* — Seed IP Law Group LLP

(57) ABSTRACT

A charging plug-in connector is provided that comprises a housing having a through-going grip opening and an actuator for activating a charging procedure, wherein the actuator extends at least in part into the through-going grip opening. This construction renders the charging plug-in connector particularly user-friendly and is still robust. If the charging plug-in connector falls down, the sensitive actuator is protected.

9 Claims, 2 Drawing Sheets

(56) References Cited

U.S. PATENT DOCUMENTS

| | | | | |
|---|---|---|---|---|
| 7,963,793 B2* | 6/2011 | Poulin | ................ | H01R 13/6275 |
| | | | | 439/352 |
| 8,016,607 B2* | 9/2011 | Brown, II | ............ | H01R 13/502 |
| | | | | 439/353 |
| 8,506,315 B2* | 8/2013 | Canedo | .................. | H01R 13/60 |
| | | | | 439/310 |
| 8,932,072 B2* | 1/2015 | Tamaki | ............. | H01R 13/6272 |
| | | | | 439/345 |
| 9,088,096 B2* | 7/2015 | Toratani | ............... | H01R 13/639 |
| 9,735,516 B2 | 8/2017 | Ens et al. | | |
| 2013/0012054 A1 | 1/2013 | Andresen et al. | | |

FOREIGN PATENT DOCUMENTS

| | | |
|---|---|---|
| CN | 205595548 U | 9/2016 |
| CN | 205709711 U | 12/2016 |
| CN | 205911553 U | 1/2017 |
| CN | 206451922 U | 8/2017 |
| DE | 10 2010 062 234 A1 | 7/2011 |
| DE | 10 2012 024 588 A1 | 6/2014 |
| WO | 2011/157841 A1 | 12/2011 |

OTHER PUBLICATIONS

Chinese Office Action, dated Sep. 29, 2019, for Chinese Application No. 201810946322.3, 6 pages.

* cited by examiner

CHARGING PLUG-IN CONNECTOR HAVING AN ACUTUATOR

BACKGROUND

Technical Field

This disclosure relates to a charging plug-in connector comprising a housing having a through-going grip opening and an actuator for activating a charging procedure.

Charging plug-in connectors of this type are used in particular for transmitting high currents and for charging electric vehicles.

In the case of electric vehicles it is necessary to be able to perform the charging procedure rapidly if this technology is to succeed over conventional vehicles having an internal combustion engine. The vehicles having an internal combustion engine may be fully fueled within a few minutes. Electric vehicles must be able to compete with this. It is necessary during rapid charging procedures to use particularly high currents which lead to an intense development of heat in the charging plug-in connectors. Charging plug-in connectors of this type are frequently plugged into a charging socket and pulled out after the charging procedure. Users are accustomed to being quite rough with fuel nozzles of conventional fuel dispensers. This behavior is also transferred directly to the charging plug-in connectors and for this reason it is necessary for such charging plug-in connectors to be extremely robust.

Description of the Related Art

EP 2 582 543 A1, which is equivalent to WO 2011/157841 A1, discloses a charging plug-in connector that is provided on its housing upper face with an actuating means. The actuating means renders it possible to latch the charging plug-in connector to a charging socket. The charging plug-in connector comprises a grip having a through-going grip opening. When a user is holding such a charging plug-in connector in his hands, it is difficult for a finger, by way of example the thumb, to reach the actuating means. The handling of such a charging plug-in connector is therefore not user-friendly. If such a charging plug-in connector falls down, the actuating means that is located on the upper face of the housing may be damaged in certain circumstances. This would lead to a failure of the plug-in connector and the charging column that is connected thereto.

DE 10 2012 024 588 A1 discloses a charging plug-in connector having an actuating means that is arranged on the housing upper face. The actuating means is operatively connected to a disconnector that is arranged in the housing. The disconnector may be activated via the actuating means and disconnect the current from the plug-in connection in the plugged-in state. The plug-in connector housing is slightly curved and thus lies easily in the hand. The user is able to reach the actuating means easily. However, if the charging plug-in connector falls down, the actuating means may still be easily damaged.

BRIEF SUMMARY

Embodiments of the present invention provide a user-friendly and simultaneously robust charging plug-in connector.

The charging plug-in connector in accordance with one or more embodiments of the invention comprises a housing having a through-going grip opening. The charging plug-in connector comprises in addition an actuator that is used to activate the charging procedure. The actuator extends at least in part into the through-going grip opening of the housing of the charging plug-in connector. A user is able to insert four fingers of his hand into the through-going grip opening with his thumb supported on the outer face of the housing. It is thus possible to hold the charging plug-in connector securely and insert it precisely into a charging socket.

This construction renders the charging plug-in connector particularly user-friendly and still robust. The sensitive actuator is protected if the charging plug-in connector falls down.

In accordance with one or more embodiments of the invention, the charging plug-in connector comprises advantageously a disconnector. The disconnector renders it possible to disconnect the current from the charging plug-in connector that is inserted into a charging socket. The term 'disconnect the current' means in this case that it is not possible for a charging current to flow via the charging plug-in connector. The disconnector only allows the current flow if the charging plug-in connector is correctly inserted into a charging socket, after which the charging procedure may commence. The disconnector represents an important safety aspect for the charging plug-in connector.

In accordance with one or more embodiments of the invention, the charging plug-in connector comprises at least two contact elements, at least one power contact element and at least one signal contact element. The charging plug-in connector comprises generally at least two power contact elements and at least two signal contact elements. A charging current is transmitted via the power contact elements. Such currents are in part extremely high currents with the result that the material of the power contact elements is correspondingly strong. The signal contact elements are used for communicating between the charging plug-in connector and the charging socket or the charging terminal and may be configured accordingly in a delicate manner.

It is preferred that the disconnector is connected to at least one contact element in an electrically conductive manner. The disconnector is operatively connected to a signal contact element. It is by way of example ensured via the signal contact elements that the charging plug-in connector is correctly inserted into the charging socket. It is also possible to exchange information via the signal contact elements, said information being used by way of example to control the strength of the charging current. A charging terminal that is connected to a charging plug-in connector in accordance with one or more embodiments of the invention comprises for this purpose an appropriate control software.

It is advantageously possible to activate the disconnector via the actuator of the charging plug-in connector. During the insertion procedure, it is necessary for a user to initially operate the actuator in order to be able to insert the charging plug-in connector into the charging socket. The current is initially disconnected from the charging plug-in connector. It is also necessary to initially operate the actuator when pulling out the charging plug-in connector from the charging socket. As a result, it is not possible for any overvoltage arcs to occur when inserting and pulling out the charging plug-in connector.

In a particular embodiment of the invention, the actuator comprises an operating lever that is fastened in a moveable manner to the housing, a lever arm that is fastened in a moveable manner to the operating lever, and a latching arm that is operatively connected to the lever arm.

The operating lever extends for the most part (up to more than 80%) into the through-going grip opening of the charging plug-in connector. The latching arm extends in the plugging-in direction out of the housing. The end of the latching arm that protrudes in the plugging-in direction out of the housing comprises a latching hook. The charging plug-in connector may be latched with a mating plug-in connector and/or with a charging socket via the latching hook.

The latching arm is advantageously mounted on a tilt axis in the housing and operatively connected to two springs, preferably helical springs, which are arranged within the housing. The latching arm comprises an activating pin. The latching arm is operatively connected to a first and a second spring. In the standby mode, the activating pin is spaced apart from the disconnector and it is thus possible for current to flow to the charging plug-in connector.

A user may draw the operating lever toward the rear in the through-going grip opening in the direction of the upper face of the housing. In so doing, the lever arm that is located within the housing is pivoted and in turn pushes the end of the latching arm that is located within the housing downward as a result of which the end of the latching arm that is located outside the housing and is provided with the latching hook is guided upward. The activating pin of the latching arm is simultaneously guided toward the disconnector. In this state, it is not possible for current to flow to the charging plug-in connector. The charging plug-in connector is disconnected from the current.

If the charging plug-in connector in this state (not connected to the current) is inserted into a charging socket and the user subsequently removes the pressure from the operating lever or releases said operating lever, it is possible for the latching hook of the latching arm to engage behind an undercut that is provided for this purpose in the charging socket and to latch the charging plug-in connector in a reversible manner with the charging socket. The activating pin of the latching arm is simultaneously moved away from the disconnector with the result that it is possible for current to flow to the charging plug-in connector.

The above described, ergonomic handling of the charging plug-in connector renders it possible for a user to permanently hold his thumb against the housing during the insertion procedure. As a result, it is ensured that charging plug-in connector is guided in a particularly safe and reliable manner when in use. If the charging plug-in connector falls down, the sensitive actuator is protected by the housing of the charging plug-in connector.

BRIEF DESCRIPTION OF THE SEVERAL VIEWS OF THE DRAWINGS

An exemplary embodiment of the invention is illustrated in FIGS. 1, 3 and 4 of the drawings and is further explained below. In the drawings.

The figures illustrate in part simplified schematic illustrations. In part, identical reference numerals are used for like but possible not identical elements. Different views of like elements could be scaled differently.

DETAILED DESCRIPTION

Figure 2:
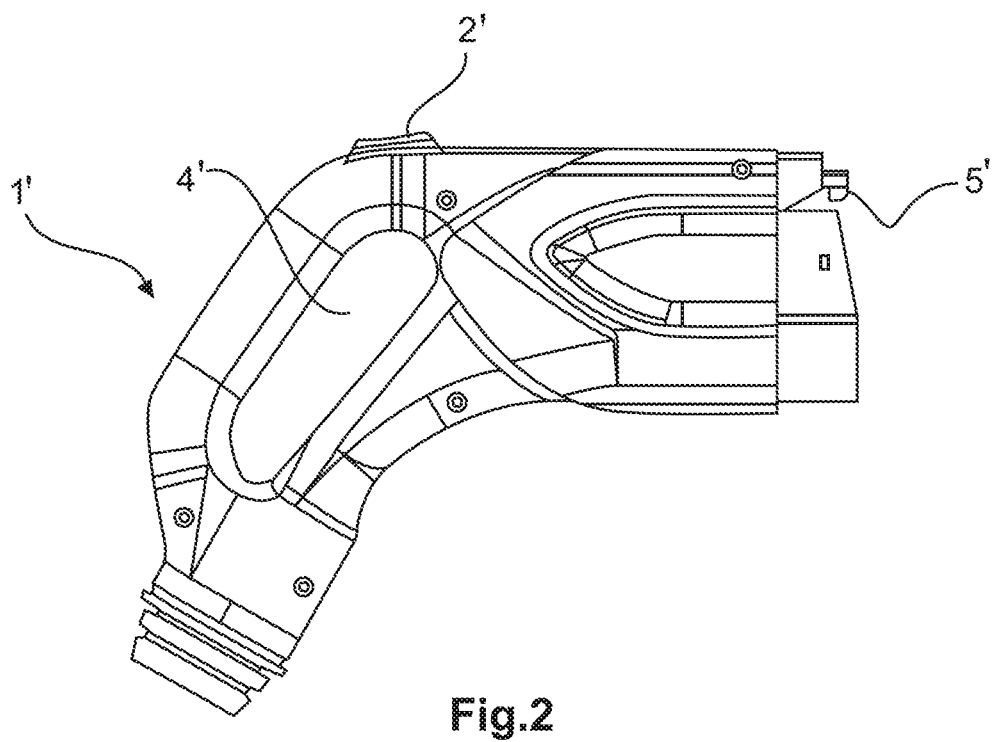
FIG. 2 illustrates a lateral view of a charging plug-in connector as is known from the prior art.

FIG. 2 illustrates a lateral view of a charging plug-in connector 1' as is known from the prior art. The charging plug-in connector 1' comprises on the housing upper face an actuating means 2' that is to be activated by a user prior to inserting the charging plug-in connector 1' into a charging socket (not illustrated). The user must activate or press the actuating means 2' with the aid of his thumb. Accordingly, the charging plug-in connector 1' must be guided into the charging socket with the aid of the remaining four fingers. This type of arrangement of guiding the charging plug-in connector is not smooth and consequently leads to premature wear on the contact elements that are provided in the charging plug-in connector.

Figure 1:
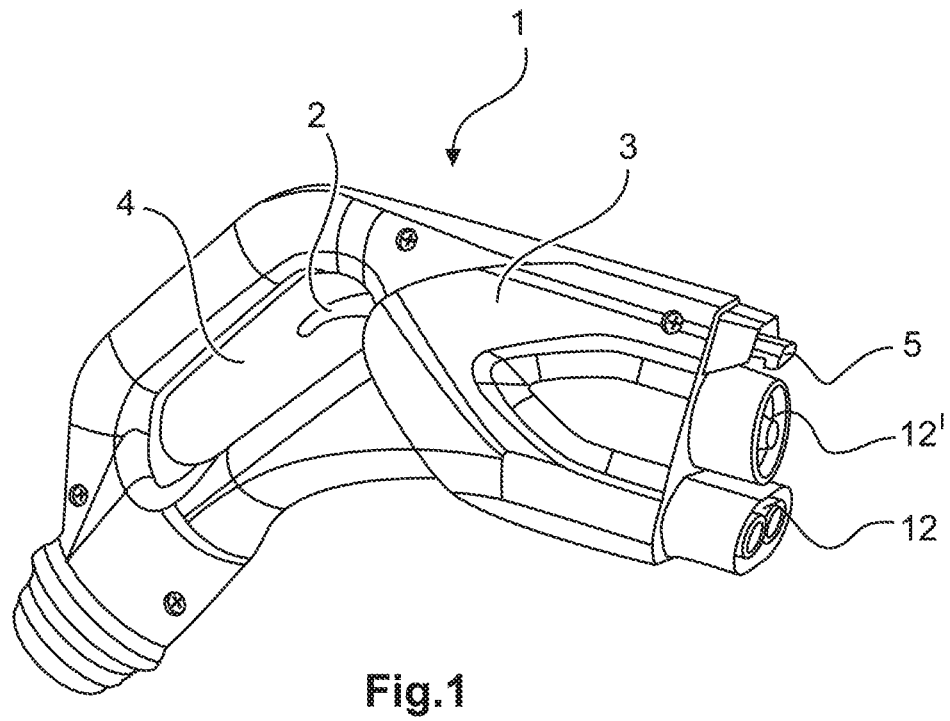
FIG. 1 illustrates a perspective view of a charging plug-in connector in accordance with the exemplary embodiment of the invention.

FIG. 1 illustrates a charging plug-in connector 1 in accordance with an exemplary embodiment of the present invention. The housing 3 of the charging plug-in connector 1 comprises a through-going grip opening 4 and an actuator 2. At least one part of the actuator 2 that is encompassed by the charging plug-in connector 1 protrudes into the through-going grip opening 4. The charging plug-in connector 1 comprises contact elements 12, 12' which may comprise one or more power contact elements and one or more signal contact elements. The object of the contact elements 12, 12' is not described in detail. The present charging plug-in connector 1 functions during the charging procedure in a similar manner to the charging plug-in connector disclosed in DE 10 2012 024 588 A1.

Figure 3:
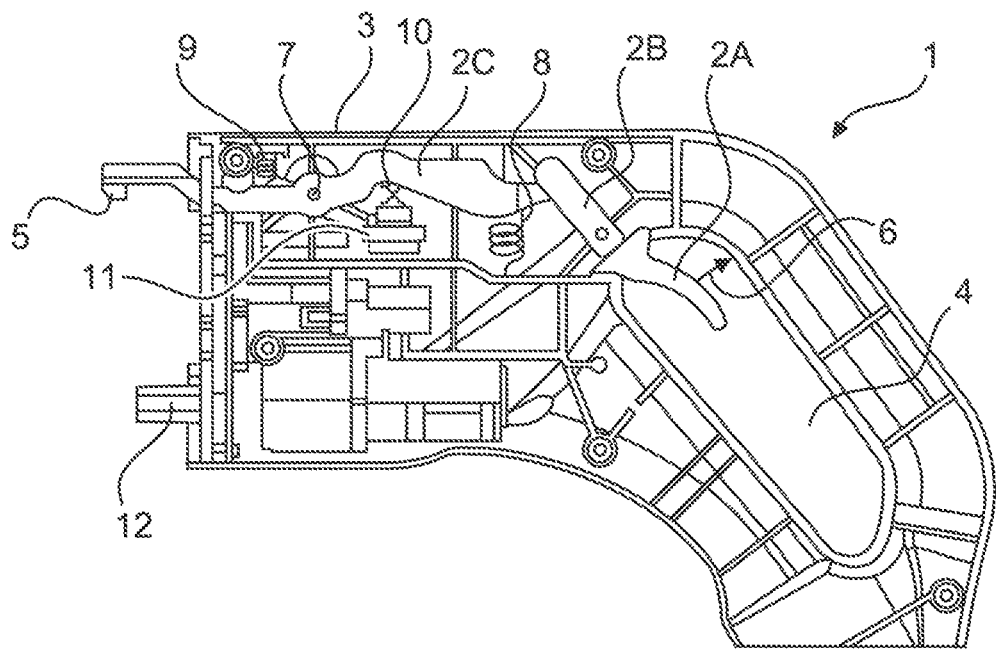
FIG. 3 illustrates a sectional lateral view of a charging plug-in connector in accordance with the exemplary embodiment of the invention in one configuration.
Figure 4:
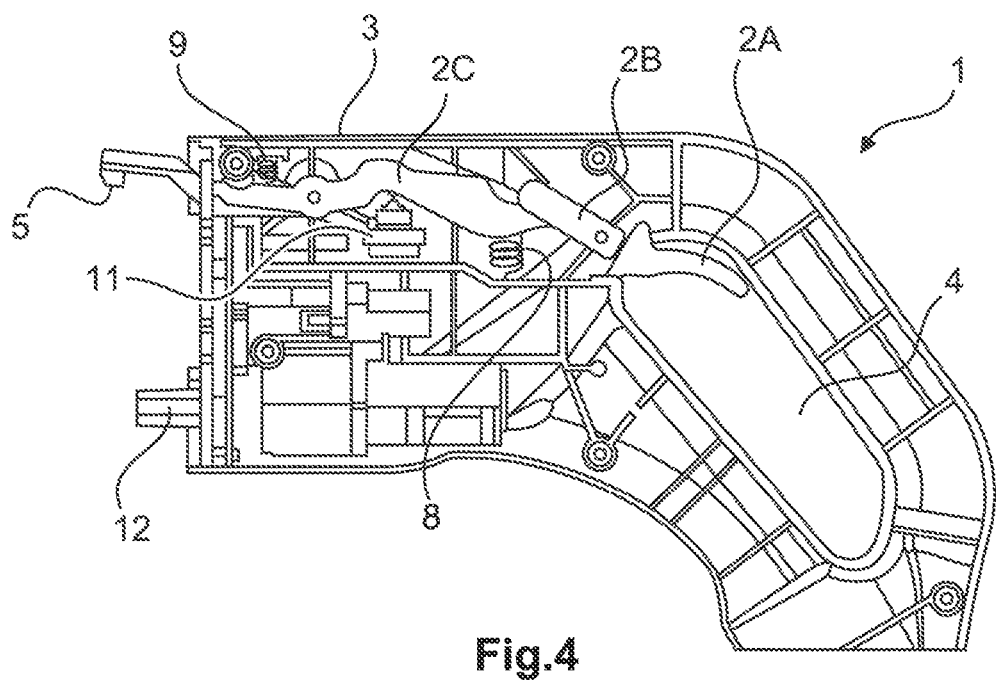
FIG. 4 illustrates a further sectional lateral view of a charging plug-in connector in accordance with the exemplary embodiment of the invention in another configuration.

It is apparent in FIGS. 3 and 4 that the actuator 2 comprises an operating lever 2A, a lever arm 2B that is fastened to said operating lever 2A, and a latching arm 2C that is connected to said lever arm 2B. The latching arm 2C protrudes at the plug-in face out of the charging plug-in connector 1. A latching hook 5 is provided at the plug-in end of the latching arm 2C. The latching arm 2C is mounted on a tilt axis 7 within the housing 3 and is operatively connected at one end to a first spring 8 and in the direction of the other end to a second spring 9. The springs 8, 9 hold the latching arm 2C in an approximately horizontal position. The latching arm 2C comprises approximately in the middle an activating pin 10 that is oriented toward a disconnector 11. In the horizontal position, the activating pin 10 of the latching arm 2C is not in physical contact with the disconnector 11 (cf. FIG. 3). Current is able to flow via the charging plug-in connector in this state.

The operating lever 2A is configured in a pistol-trigger shape. The user is able to reach the operating lever 2A comfortably with his index finger within the through-going grip opening 4. His thumb remains on the housing 3 of the charging plug-in connector 1. As a result, it is ensured that the charging plug-in connector 1 is guided in a safe and reliable manner. The charging plug-in connector 1 may be guided into a charging socket (not illustrated) or pulled out of the charging socket in a safe and reliable manner and without the contact elements experiencing excessive wear.

If the operating lever 2A is moved or pulled in the direction of the arrow 6, shown in FIG. 3, the latching arm 2C is moved via the lever arm 2B into the upper position, as illustrated in FIG. 4. The end-side latching hook 5 likewise moves upward as a result. The activating pin 10 of the latching arm 2C is simultaneously guided toward the disconnector 11 and brought into physical contact therewith as a result of which the disconnector is activated and the current supply to the charging plug-in connector 1 is interrupted. The charging plug-in connector 1 may be guided in this state into a charging socket (not illustrated) or pulled out of a charging socket.

As soon as the charging plug-in connector 1 is inserted into the charging socket, the user is able to remove the pressure from the operating lever 2A of the actuator 2. The latching arm 2C is returned to its horizontal starting position via the springs 8 and 9. The end-side latching hook 5 moves back downward and is able to engage behind an undercut in the charging socket (not illustrated). As a result, the charging plug-in connector 1 and the charging socket (not illustrated) latch with one another in a reversible manner.

The user is able to actuate the operating lever 2A again once the charging procedure is terminated. As a result, the latching arrangement between the charging plug-in connector 1 and the charging socket is released and the disconnector 11 is simultaneously actuated via the activating pin 10 of the latching arm 2C. The charging plug-in connector 1 is now disconnected from the current and may be pulled out of the charging socket safely.

Even if the exemplary embodiment shown in FIGS. 1, 3 and 4 illustrate different aspects or features of the invention respectively in combination, it is apparent to the person skilled in the art—unless otherwise stated—that the illustrated and discussed combinations are not the only possible combinations. In particular, it is possible to exchange with one another mutually corresponding elements or feature complexes from different exemplary embodiments. In other words, various features and aspects of the embodiments described above can be combined to provide further embodiments.

In addition, the foreign patent application listed in the Application Data Sheet, namely, German patent application DE 10 2017 119 056.2, filed Aug. 21, 2017, is incorporated herein by reference in its entirety. Aspects of the embodiments can be modified, if necessary, to employ concepts of the application to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A charging plug-in connector, comprising:
   a housing having a through-going grip opening and a plug-in face; and
   an actuator for activating a charging procedure,
   wherein the actuator extends at least in part into the through-going grip opening of the housing,
   wherein the actuator includes an operating lever accessible by a user via the through-going grip opening, a lever arm extending from the operating lever, and a latching arm operably connected to the lever arm,
   wherein the latching arm includes a proximal end that is positioned within the housing and attached to the lever arm within an upper region of the housing, and a distal end that protrudes through the plug-in face of the housing,
   wherein the latching arm is pivotably supported about a tilt axis located within the upper region of the housing,
   wherein the distal end of the latching arm is biased downwardly by a spring acting upwardly on the proximal end of the latching arm, and
   wherein an activating pin is provided on the latching arm forward of the spring toward the tilt axis for engaging a disconnector by which to disconnect the charging plug-in connector from a charging current.

2. The charging plug-in connector as claimed in claim 1, wherein the charging plug-in connector comprises at least two contact elements, at least one power contact element and at least one signal contact element.

3. The charging plug-in connector as claimed in claim 1, wherein the operating lever extends from the upper region of the housing into the through-going grip opening of the housing of the charging plug-in connector.

4. The charging plug-in connector as claimed in claim 1, wherein the distal end of the latching arm extends in a plugging-in direction out of the plug-in face of the housing.

5. The charging plug-in connector as claimed in claim 1, wherein the latching arm is operatively connected to another spring that is arranged within the housing to act downwardly on the distal end of the latching arm.

6. The charging plug-connector as claimed in claim 1, wherein the distal end of the latching arm protrudes in a plugging-in direction out of the plug-in face of the housing and comprises a latching hook configured to latch the charging plug-in connector with at least one of a mating plug-in connector and a charging socket.

7. The charging plug-in connector as claimed in claim 1, wherein the charging plug-in connector further comprises the disconnector by which it is possible to disconnect the charging plug-in connector from the charging current when said charging plug-in connector is inserted in a charging socket.

8. The charging plug-in connector as claimed in claim 7, wherein the disconnector is configured to be activated by the activating pin provided on the latching arm of the actuator.

9. The charging plug-in connector as claimed in claim 7, wherein the disconnector is connected to at least one contact element of the charging plug-in connector in an electrically conductive manner.

* * * * *